United States Patent [19]

Belcher et al.

[11] 4,227,174
[45] Oct. 7, 1980

[54] DISTRESS/HAZARD SIGNAL FLASHER

[75] Inventors: Robert A. Belcher, 23 Grove St., San Rafael, Calif. 94901; Gregg D. Ahumada, San Rafael, Calif.

[73] Assignee: Robert A. Belcher, San Rafael, Calif.

[21] Appl. No.: 891,670

[22] Filed: Mar. 30, 1978

[51] Int. Cl.² .......................... G08B 5/38; B60Q 1/26
[52] U.S. Cl. .................................. 340/81 R; 340/321
[58] Field of Search ............. 340/81, 321, 340, 384 E, 340/378

[56] References Cited

U.S. PATENT DOCUMENTS

| B 222,188 | 1/1975 | Cauglin et al. | 340/81 R |
|---|---|---|---|
| 3,027,491 | 3/1962 | Seidler | 315/159 |
| 3,226,707 | 12/1965 | Newman et al. | 340/324 |
| 3,810,150 | 5/1974 | Jacobs | 340/340 |
| 3,965,468 | 6/1976 | Bronson | 340/331 |
| 4,105,996 | 8/1978 | Shimizu | 340/81 R |
| 4,124,842 | 11/1978 | Bachelor | 340/331 |

*Primary Examiner*—Donald J. Yusko
*Attorney, Agent, or Firm*—Townsend and Townsend

[57] ABSTRACT

An automotive lamp flasher provides a visibly irregular series of flashes to indicate the existence of a distress situation. The flasher also provides a regular series of flashes as is done by existing flashers. Circuitry is provided to generate a nonuniform pulse train and repeatedly apply this pulse train to a lamp activation circuit. Broadly, a multiplexer with a plurality of input terminals is used, each having a logic level thereon. The multiplexer is sequentially stepped to provide an output representative of the sequence of logic levels on the input terminals. Preferred stepping means includes a timer for supplying a continuous sequence of uniformly spaced pulses, and a scaler responsive to these pulses for supplying a sequence of binary codes to the multiplexer.

12 Claims, 4 Drawing Figures

DISTRESS/HAZARD SIGNAL FLASHER

BACKGROUND OF THE INVENTION

Modern automobiles are invariably equipped with a so-called "emergency flasher" which, when activated by the driver, simultaneously activates flashing lights on all four corners of the vehicle. These lights are often the same lights that are also used as turn signals. While these four-way flashers may have originally been intended to provide indications of an emergency situation, increased and often indiscriminate use by the driving public has degraded the impact of these emergency flashers so that they provide no more than an indication that the vehicle is stopped, and is likely to remain so for more than an instant. Thus the emergency flasher does provide a very useful safety feature in that it tends to protect stopped cars from being hit by moving cars. However, there still exists the need for a device whereby a driver can signify to other drivers that a distress situation exists and that he needs help.

A common way of indicating that help is needed is to erect a flag, typically on the radio antenna. Since many newer cars have radio antennae built into the windshield glass, and since many automobiles do not have radios at all, it is also a practice to tie a handkerchief to the door handle.

The use of a flag-like indicator is not without its problems. The driver must get out of the automobile to place the flag in a visible position. This may be dangerous to the driver, may be undesirable due to bad weather, and may even be impossible, as for example, if the driver has become incapacitated. Moreover, a flag may not be visible in bad weather, especially at night.

Another way of signalling to passing motorists that a distress situation exists is the placement of verbal signs on the rear ledge of the automobile so that they can be seen through the rear window. However, such signs tend to become lost or damaged so that they are not available when need for their use arises. Also, snow, dirt, window fog, or glare can prevent the sign from being visible. In addition, an incapacitated driver may be physically incapable of reaching over to the back ledge to place the sign in position.

U.S. Pat. No. 3,226,707 to Newman et al. discloses a device which overcomes some of these difficulties. Basically, it is a permanently mounted fixture with a variety of internally stored signs, any one of which can be placed in a position for viewing. While such a device provides for relatively easy actuation by a disabled driver, it still relies on visibility through the rear window. Moreover, a permanent fixture for signs may be unsightly, can interfere with driver visibility out of the rear window, and is likely to be relatively expensive.

SUMMARY OF THE INVENTION

The present invention is an automotive device for providing an indication to other motorists that aid is required. The device is easily actuable, provides an indication which is highly visible while having no external manifestation when not in use, and can be adapted to existing wiring in the car without substantial modification. Broadly, the invention is an improved four-way flasher which is capable of providing a visibly irregular sequence of flashes, to indicate the existence of a distress situation. The invention also has the capability of providing a regular sequence of flashes as is done by existing flashers.

The improved flasher contains circuitry for providing a pulse train wherein the pulses have non-uniform spacing and duration, and for repeatedly applying this pulse train to a lamp activation circuit. Broadly, a multiplexer with a plurality of input terminals is used, each having a logic level thereon. The multiplexer is sequentially stepped to provide an output representative of the sequence of logic levels on the input terminals. Preferred stepping means includes a timer for supplying a continuous sequence of uniformly spaced pulses, and a scaler responsive to these pulses for supplying a sequence of binary codes to the multiplexer.

According to one aspect of the invention, the circuitry is packaged so as to be plug compatible with existing automotive flasher wiring sockets. This is preferably in the form of a small box having two or three prongs, depending on the socket. Thus the improved flasher can be easily substituted for the existing flasher in an automobile. A selector switch, preferably mounted within easy reach of the driver allows selection of either a uniform or a non-uniform pulse train. In the two-prong version, a ground connection for the circuitry may be taken from the switch.

DESCRIPTION OF THE PREFERRED EMBODIMENTS

Figure 1:
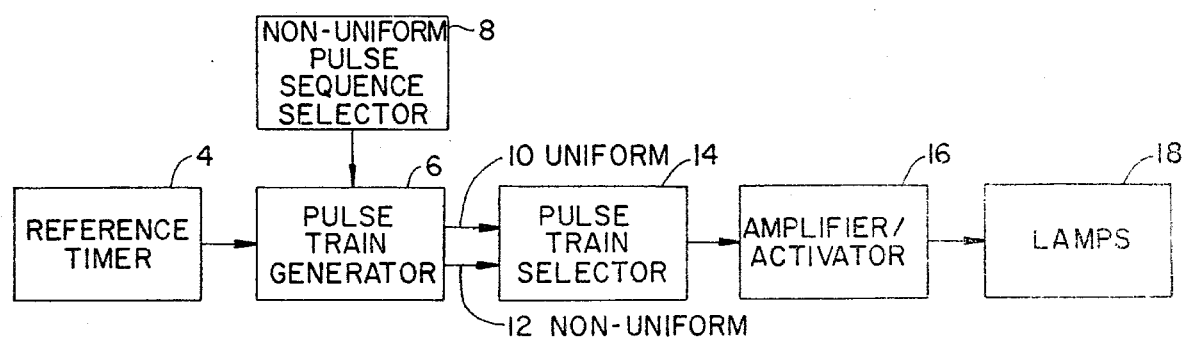
FIG. 1 is a block diagram illustrating the principle of the invention.

Turning to the drawings, FIG. 1 sets forth the basic functioning of the present invention. Broadly, a plurality of lamps on an automobile is caused to flash on and off in a fashion representative of one of two electrical pulse trains. The first pulse train is uniform, i.e., the pulses are equally spaced and of equal duration. The second pulse train is non-uniform in that either the spacing or duration of the pulses varies from pulse to pulse. Reference timer 4 provides a uniform sequence of pulses to pulse train generator 6. Non-uniform pulse sequence selector 8 defines the sequence of non-uniform pulses. Pulse train generator 6 supplies a uniform pulse train on line 10, and a non-uniform pulse train on line 12. Pulse train selector 14, which preferably includes manually actuatable means transmits a pulse sequence representative of the selected pulse train to amplifier/activator 16, thereby activating lamps 18. Thus, the uniform pulse train results in a regular flashing sequence, as is provided by existing automobile flashers. The non-uniform pulse train causes an irregular sequence of light flashes which is used to signify a distress situation.

Figure 2A:
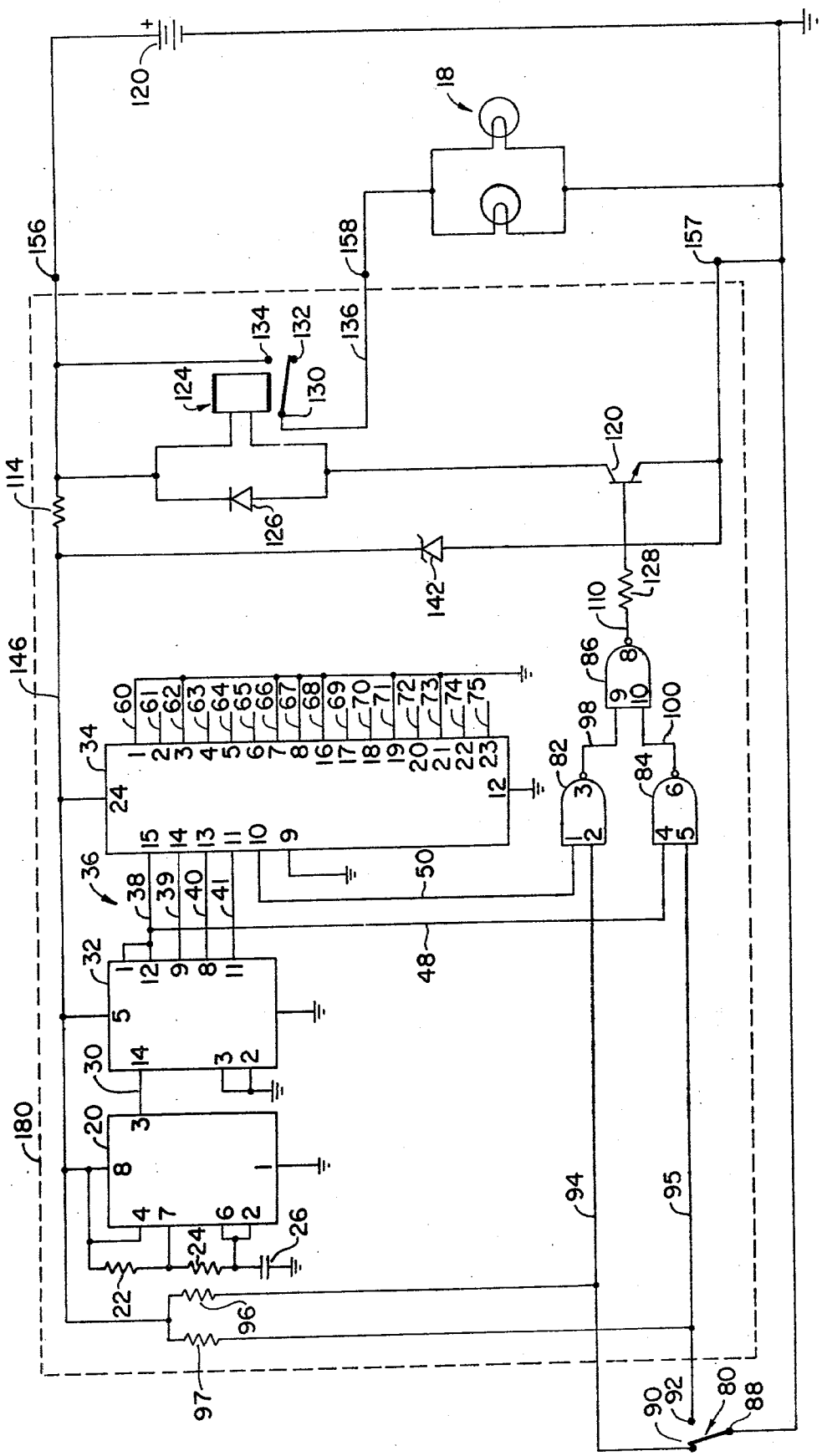
FIG. 2A is a circuit diagram of the invention, suitable for replacing existing 3-prong flashers.
Figure 2B:
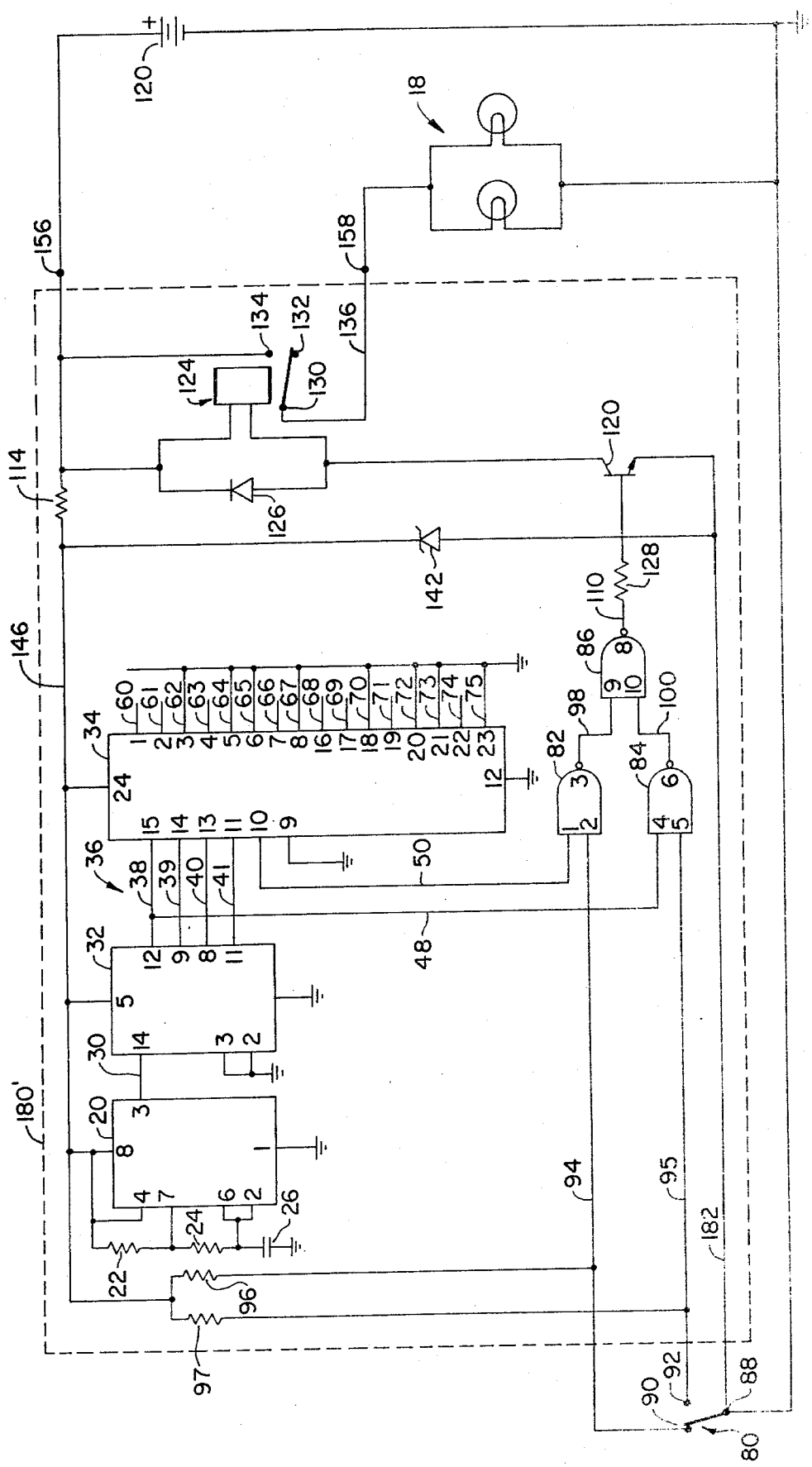
FIG. 2B is a circuit diagram of the invention, suitable for replacing existing 2-prong flashers.

FIGS. 2A and 2B show preferred embodiments of circuitry for realizing the functions set forth in FIG. 1. Solid state integrated circuit elements (to be described below) are used. Each of these elements has a configuration of pins that is industry-standard, and references to pin numbers refer to the standard configuration for the element in question.

Referring to FIG. 2A, reference timer 4 of FIG. 1 preferably comprises a type 555 timer 20 such as that manufactured by Fairchild Camera and Instrument Corporation, Mountain View, Cal., 94042 (herein after Fairchild), 20K resistor 22 is connected between pins 7 and 8, 1K resistor 24 between pins 6 and 7, and 22 microfarad capacitor 26 between pin 6 and ground. Pin 8 is connected to a 5-volt power supply (as described below), and pin 1 is grounded. Pin 2 is shorted to pin 6, and pin 4 is shorted to pin 8. Pin 3 is connected to line 30.

Pulse train generator 6 and non-uniform pulse sequence selector 8, both of FIG. 1 together comprise scaler 32 and multiplexer 34. Scaler 32 may be a type 7493 4-bit binary counter manufactured by Fairchild. Pin 5 of Scaler 32 is connected to the 5-volt power supply and pin 10 is grounded. Pins 1 and 12 are shorted, and pins 2 and 3 are shorted and tied to ground. Line 30 is input to pin 14 on counter 32. Pins 12, 9, 8, and 11 are connected to 4-bit data line 36 which comprises individual lines 38, 39, 40 and 41. Pin 12 of Scaler 32 is also connected to output line 48.

Multiplexer 34 may be a type 74150 manufactured by Fairchild. Pin 24 of multiplexer 24 is connected to the 5-volt power supply and pin 12 is grounded. Pin 9 is grounded. Lines 38–41 are input to pins 15, 14, 13 and 11 of multiplexer 34. Pin 10 of multiplexer 34 is connected to output line 50.

Multiplexer 34 has 16 input data lines 60–75, connected to pins 1–8 and 16–23 respectively. Each line may be supplied with a low logic level by being shorted to ground, or may be supplied with a high logic level by being left open or tied to the supply voltage through a large value resistor. The choice of which of data lines 60–75 to provide with a low or high logic level is dictated by the desired irregular sequence of pulses as will be more fully described below.

Pulse train selector 14 of FIG. 1 preferably comprises a selector switch 80 having a pole 88 and contacts 90 and 92, and three nand gates 82, 84, and 86. Selector switch 80 is preferably a single pole-double-throw slide or toggle switch having pole 88 grounded and contacts 90 and 92 connected to lines 94 and 95 respectively. Lines 94 and 95 are connected to the 5-volt supply through 22K resistors 96 and 97 respectively.

Gates 82, 84 and 86 are preferably part of a type 7400 quad two input nand gate chip manufactured by Fairchild. Only 3 of the 4 nand gates of the chip are used. Lines 50 and 94 are input to nand gate 82 (connected to pins 1 and 2). Lines 48 and 95 are input to nand gate 84 (connected to pins 4 and 5). Pins 3 and 6 corresponding to the output from nand gates 82 and 84 respectively are connected to lines 98 and 100 respectively. Lines 98 and 100 are inputs to nand gate 86 (connected to pins 9 and 10). Pin 8, the output of nand gate 86 is connected to line 110.

Amplifier/activator 16 of FIG. 1 preferably comprises a transistor 120, a relay 124, a damper diode 126, and a 1K resistor 128. Transistor 120 has its emitter grounded, and its base connected to line 110 through 1K resistor 128. The collector of transistor 120 is connected through the activation coil of relay 124 to the positive terminal of the automobile battery 120. Damper diode 126 connected across relay 124 in the collector circuit is back biased and protects the transistor from excess voltage build up which may occur when transistor 120 is turned off and the coil field of relay 124 collapses.

Transistor 120 may be a type 2N2222 NPN transistor. Diode 126 may be type 1N4001. Relay 124 is a 12 volt relay having a resistance in its activation coil in the range of 1.2K. Relay 124 has a pole 130 and contacts 132 and 134. Contact 132 is left open, and contact 134 is connected to the positive terminal of the battery. Pole 130 engages contact 132 when relay 124 is not activated, and engages contact 134 when relay 124 is activated. Pole 130 of relay 124 is connected to line 136.

The entire circuit gets its power from the automobile battery. The integrated circuit elements typically require a stabalized 5-volt power supply. Since the car battery provides a voltage (6-volt or 12-volt) that is above this value and is furthermore subject to fluctuation, the circuit must also contain its own 5-volt power supply. A 5 volt zener diode 142 is therefore used which has its anode grounded. A 47 ohm resistor 114 is connected between its cathode and the positive battery terminal. The resulting 5-volt level, suitable for supplying the integrated circuit components is taken off the cathode of zener diode 142 on line 146.

Figure 3:
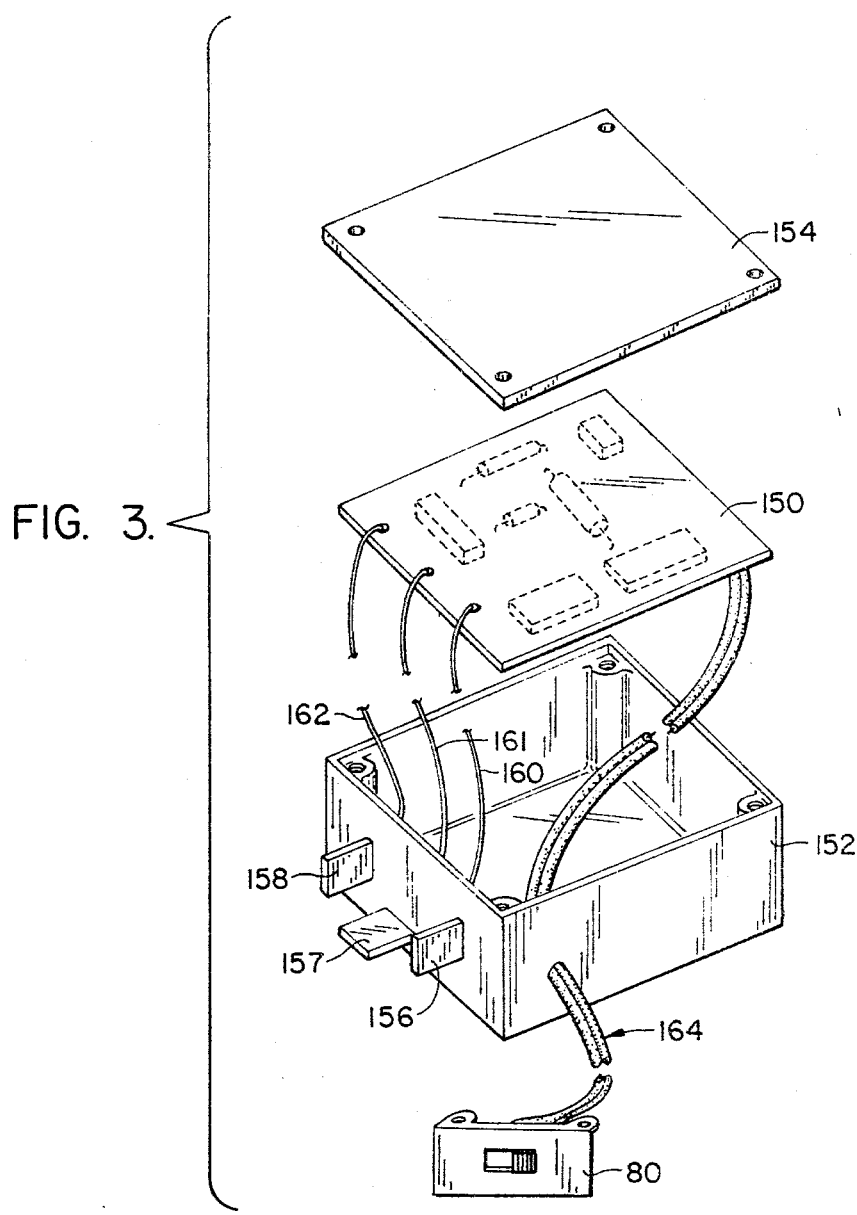
FIG. 3 is an exploded perspective view showing a preferred packaging of the electronic circuitry of FIG. 2A in a form especially adapted to be fitted into existing automobile flasher circuits.

The circuit as described above is preferably packaged as shown in FIG. 3. The circuit elements, shown schematically in phantom, are mounted to a small circuit board 150 which is housed in a box 152. Box 152 is preferably molded from an insulating material such as plastic, and has a cover 154 which may be bolted or otherwise fastened in place. Existing automotive flasher modules are of either a 2 or 3 prong design. The first prong is connected to the positive battery terminal, and the second is connected to one terminal of the lamps to be activated (the second terminal of the lamp to be activated being connected to ground). The third terminal (if any) is grounded. The operation of the flasher is such that the second terminal is repetitively shorted to the first, thereby energizing it with the battery voltage. In between, the second terminal is an open circuit. The above-described packaging of the present invention is designed to allow the present invention to be used in existing automobiles to replace existing flasher modules. FIG. 3 illustrates a 3-pronged device having metal prongs 156, 157, and 158, which are adapted to the standard automobile wiring sockets. Although the configuration of prongs may vary from one automobile manufacturer to another, it may be assumed for illustration purposes that prong 156 communicates to the automobile battery's positive terminal, that prong 157 communicates to the vehicle ground (the battery's negative terminal) and that prong 158 communicates to the lamps to be flashed. Prongs 156, 157, and 158 communicate to the circuit board and the elements thereon by wires 160, 161 and 162 respectively. Selector switch 80, and more particularly contacts 90 and 92 thereof are connected to the circuit by a multiple conductor 164 (which includes lines 94 and 96, of sufficient length that switch 80 can be mounted at a position where it is readily acceptable to the driver of the vehicle. Thus the switch might be mounted near the existing flasher actuation switch.)

Referring to FIGS. 2A and 3, it can be seen that the circuit elements within dashed rectangle 180 of FIG. 2A correspond to those circuit elements on circuit board 150 that fit within box 152. The 3 prongs 156, 157, and 158 in both figures correspond to the same items.

FIG. 2B shows circuitry for use in a 2 prong installation. The circuitry is the same as that in FIG. 2A, except that prong 157 of FIG. 2A which communicates ground to the internal circuit elements is not present. Rather, ground for the circuit is supplied from pole 88 of switch 80, which is grounded by its mechanical connection to the automobile. Thus, it is necessary for an extra lead between switch 80 and the circuit elements within dashed rectangle 180'. Extra wire 182 leads from grounded pole to the circuits.

Having thus described the circuitry, the operation can be understood. Timer 20 provides a uniform sequence of pulses at pin 3 which are output on line 30. The repetition rate is determined by the voltage divider comprising 20K resistor 22 and 1K resistor 24. Resistor 22 may be varied to achieve a pulse repetition rate in the range of 2–4 pulses per second, which is twice the standard flasher frequency (typically required to be in the range of 1–2 pulses per second). Counter 32 counts the pulses on line 30, and generates a binary code on lines 38–41, according to the number of pulses that have come in on line 30. In the preferred embodiment, counter 32 is a 4-bit counter having four output lines corresponding to 16 binary states. The outputs on individual lines 38, 39, 40, and 41 are uniform pulse trains with frequencies that are divisions of the frequency of pulses on line 30, the reduction being by factors of 2, 4, 8, and 16, respectively. Also each of these four pulse trains has its pulse duration equal to the interval between pulses. Thus, the output on line 48 (the same as the output on line 38) is suitable for driving lamps at the standard flasher frequency. It is the nature of the operation of binary counter 32 that the sequence of binary codes generated on four-bit line 36 repeats itself after 16 pulses have come in on line 30.

The binary code on lines 38–41 is fed to multiplexer 34. Depending on the binary code input to multiplexer 34, the logic level on the corresponding data line 60–75 will appear, inverted, on multiplexer output line 50. Thus, the sequence of pulses on line 50 is representative of the sequence of data line levels. Since the sequence of binary code on 4-bit line 36 recycles every 16 pulses from timer 20, a sequence of 16 logic levels is provided, that sequence repeating itself every 16 pulses from timer 20.

While it would be possible to set the logic levels on lines 60–75 in any one of a number of ways without departing from the spirit of this invention, two preferred sequences are set forth in the following table, referenced below as Table 1.

| (multiplexer line) | (logic level) (0 = low, 1 = high) | |
| --- | --- | --- |
| 60 | 0 | 1 |
| 61 | 1 | 1 |
| 62 | 0 | 0 |
| 63 | 1 | 1 |
| 64 | 1 | 0 |
| 65 | 1 | 0 |
| 66 | 0 | 1 |
| 67 | 0 | 0 |
| 68 | 0 | 1 |
| 69 | 1 | 1 |
| 70 | 1 | 0 |
| 71 | 0 | 1 |
| 72 | 1 | 0 |
| 73 | 0 | 0 |
| 74 | 1 | 1 |
| 75 | 1 | 0 |

FIGS. 2A and 2B illustrate the connections for the first and second sequences respectively.

Selector switch 80 determines which pulse sequence, the regular one on line 48, or the non-uniform one on line 50, is output on line 110. When pole 88 is connected to contact 90, thereby putting a low level on line 94, the output from nand gate 82 on line 98 is constantly high. At the same time, given the high level on line 95 to nand gate 84, the output on line 100 is the inverse of the pulse train on line 48. Given the condition on lines 98 and 100, the output on line 110 is the inverse of the pulse train on line 100, or equivalently, it follows the pulse train on line 48. Similarly, if selector switch 80 is set with pole 88 contacting contact 92, the output on line 110 is the pulse train on line 50. Thus, the selector switch and the nand gates serve to put one of the pulse trains on line 110.

The pulse train on line 110 turns transistor 120 on in a corresponding fashion, thereby energizing relay 124 accordingly. Thus, terminal 158 is connected to the battery voltage in a fashion corresponding to the pulse train on line 110. It should be noted, that since the multiplexer output on line 60 is inverted with respect to the logic levels on lines 60–75, the sequence of flashes is complimentary to the sequence of logic levels on lines 60–75.

Referring to Table 1, it can be seen that the first sequence of levels gives rise to a pattern of flashes that is basically a long flash (levels on lines 66–68) with four short flashes occurring before the next long flash. The second sequence results in a repetitive series of short-long-short flashes.

We claim:

1. Apparatus for flashing a plurality of lamps on a vehicle, the lamps being operatively coupled to at least one lamp activation means, comprising:

output terminal means adapted to be coupled to the lamp activation means, the output terminal means having a first state wherein the lamp activation means is enabled, and a second state wherein the lamp activation means is disabled;

first pulsing means adapted to be coupled to the output terminal means for any arbitrary desired duration for causing the output terminal means to alternately assume its first state and its second state, wherein the time intervals during which the output terminal means is in its first state are of substantially equal length, and wherein the time intervals during which the output terminal means is in its second state are of substantially equal length, thus defining a uniform pulse sequence;

second pulsing means adapted to be coupled to the output terminal means for any arbitrary desired duration for causing the output terminal means to alternately assume its first state and its second state, wherein at least two of the time intervals during which the output terminal means is in its first state are of unequal length, thus defining a non-uniform pulse sequence which is repeatedly applied to the output terminal means for as long as the second pulsing means is coupled to the output terminal means; and manually actuable selection means operatively coupled between the first pulsing means, the second pulsing means and the output terminal means for selectively coupling the first pulsing means or the second pulsing means to the output terminal means.

2. Apparatus for controlling lamp activation means to flash a plurality of lamps on a vehicle according to a predetermined time sequence comprising:

output terminal means adapted to be coupled to the lamp activation means such that a pulse train appearing at the output terminal means causes the lamp activation means to flash the lamps according to a time sequence representative of the pulse train appearing at the output terminal means;

a plurality of input terminal means, each input terminal means adapted to receive a logic signal;

a corresponding plurality of logic signal generating means, each said means applying a logic signal to a corresponding input terminal means;

uniform pulsing means for generating a first uniform pulse train;

means responsive to the uniform pulsing means for sequentially coupling signals on the plurality of input terminal means to the output terminal means;

such that a pulse train appears at the output terminal means, the pulse train being a serial representation of the logic signals on the plurality of input terminal means;

whereby the lamps are flashed according to a time sequence representative of the sequence of logic signals applied to the plurality of input terminal means;

means for coupling the uniform pulsing means to the output terminal means wherein a second uniform pulse train representative of the first uniform pulse train appears on the output terminal means; and manually actuable selection means having a first position wherein the means for coupling the uniform pulsing means to the output terminal means is activated and wherein the sequential coupling means is deactivated and a second position in which the uniform pulsing means is deactivated and the sequential coupling means is activated.

3. The invention of claim 2 wherein the sequential coupling means includes scaler means, and multiplexing means coupled to the scaler means.

4. Apparatus for simultaneously activating a plurality of lamps on an automobile according to either of two modes, the first mode being a uniform sequence of pulses, the second mode being a non-uniformly spaced sequence of pulses, comprising:

timing means for generating a first uniform pulse train wherein the pulses have uniform spacing and uniform duration;

lamp activation means adapted to cause the lamps to be illuminated;

output terminal means coupled to the lamp activation means wherein a logic signal appearing at the output terminal means causes the lamp activation means to illuminate the lamps responsively to and representative of the logic signal;

an ordered plurality of input terminal means, at least one of which input terminal means is at a first logic level and at least another of which input terminal means is at a second logic level;

first coupling means responsive to the timing means and adapted to sequentially couple the logic levels on the ordered plurality of input terminal means to the output terminal means;

means responsive to the timing means for generating a second uniform pulse train wherein the pulses have uniform spacing and uniform duration;

second coupling means adapted to couple a logic signal representative of the second uniform pulse train to the output terminal means; and manually actuable selection means having a first position wherein the first coupling means is disabled and the second coupling means is enabled, and a second position wherein the first coupling means is enabled and the second coupling means is disabled.

wherein the lamps are activated according to the first or second mode when the selection means is in its first or second position respectively.

5. The invention of claim 4 wherein the pulses of the second uniform pulse train have their spacing substantially equal to their duration.

6. Apparatus for simultaneously activating a plurality of lamps on an automobile according to either of two modes, the first mode being a sequence of uniformly spaced pulses, the second mode being a non-uniformly spaced sequence of pulses, comprising:

timing means for generating a first uniform pulse train wherein the pulses have uniform spacing and uniform duration;

lamp activation means adapted to cause the lamps to be illuminated;

output terminal means coupled to the lamp activation means wherein a logic signal appearing at the output terminal means causes the lamp activation means to illuminate the lamps responsively to and representative of the logic signal;

scaler means operatively coupled and responsive to the first uniform pulse train of the timing means for repetitively generating a serial sequence of binary codes;

an ordered plurality of input terminal means, at least one of the input means being at a first logic level and at least one other of the input terminal means being at a second logic level, each input terminal means corresponding to at least one binary code;

multiplexer means operatively coupled to the scaler means for generating a logic signal representative of the logic level on one of the input terminal means when the binary code from the scaler means corresponds to that input terminal means;

such that the serial sequence of binary codes causes the multiplexer means to produce a first non-uniform pulse train that is a serial representation of the logic signals on the plurality of input terminal means;

means responsive to the least significant bit of the binary code for generating a second uniform pulse train wherein the pulses have uniform spacing and uniform duration, and spacing between pulses being substantially equal to the duration of the pulses; and manually actuatable selection means for selectively and exclusively coupling to the output terminal means pulse trains representative of the first non-uniform pulse train and the second uniform pulse train;

whereby the lamps are flashed in one of the two modes depending on the position of the manually actuatable selection means.

7. The invention of claim 6 wherein the binary code has a number of bits corresponding to the integer n, and the plurality of input terminal means has a number of input terminal means corresponding to the integer $2^n$.

8. The invention of claim 6 wherein the selection means comprises a switch having at least two positions, and a plurality of logic gates operatively coupled between the switch, the multiplexer means, the second uniform pulse train generating means, and the output terminal means.

9. The invention of claim 6 wherein the lamp activation means includes a transistor operatively coupled to the output terminal means, the transistor having a conducting state and a non-conducting state and being capable of being switched between said states according to the time sequence of the pulse train appearing at the output terminal means, and a relay operatively coupled to the transistor such that the relay causes the lamps to be illuminated when the transistor is in its conducting state.

10. In combination with an automobile having a plurality of signal lamps and lamp activation means, an improved flasher unit for selectively flashing the signal lamps according to either of a first uniform mode and a second non-uniform mode comprising:
output terminal means coupled to the lamp activation means;
manually actuable selection means having a first position and a second position;
first pulsing means for generating a uniform pulse train and applying the uniform pulse train to the output terminal means when the selection means is in its first position;
second pulsing means for producing a non-uniform pulse train and for applying the non-uniform pulse train to the output terminal means continuously and repeatedly when the selection means is in its second position, thus causing the lamps to be activated in a visibly irregular flashing manner corresponding to the non-uniform pulse train.

11. The invention of claim 11 wherein the second pulsing means comprises:
multiplexer means having a plurality of input means at respective logic levels to define the non-uniform pulse train; and
means for sequentially and cyclically coupling the logic levels on the multiplexer means inputs to the output terminal means so that a pulse train representative of the sequence of logic levels on the input terminals appears at the output terminal to define the non-uniform pulse train.

12. A method of providing either of two degrees of warning to people outside an automobile having a plurality of signal lamps from within the automobile, comprising the steps of:
providing manually actuable selection means having first and second positions;
communicating a first uniform pulse train to a plurality of signal lamps on the automobile when the selection means is in its first position; and
communicating a second non-uniform pulse train to the plurality of lamps during the time interval that the selection means is in its second position.

* * * * *